United States Patent
Martinchek et al.

(10) Patent No.: US 9,997,800 B2
(45) Date of Patent: Jun. 12, 2018

(54) FUEL CELL STACK AND ASSEMBLY METHOD OF SAME

(71) Applicants: GM Global Technology Operations LLC, Detroit, MI (US); Honda Motor Co., Ltd., Tokyo (JP)

(72) Inventors: David A. Martinchek, Spencerport, NY (US); Robert C. Thompson, Lockport, NY (US); Masaaki Sakano, Saitama (JP); Hiroyuki Tanaka, Saitama (JP)

(73) Assignee: GM Global Technology Operations LLC, Detroit, MI (US)

( * ) Notice: Subject to any disclaimer, the term of this patent is extended or adjusted under 35 U.S.C. 154(b) by 541 days.

(21) Appl. No.: 14/326,813

(22) Filed: Jul. 9, 2014

(65) Prior Publication Data

US 2016/0013508 A1 Jan. 14, 2016

(51) Int. Cl.
*H01M 8/24* (2016.01)
*H01M 8/2475* (2016.01)
(Continued)

(52) U.S. Cl.
CPC ....... *H01M 8/2475* (2013.01); *H01M 8/2404* (2016.02); *H01M 8/248* (2013.01)

(58) Field of Classification Search
CPC .. H01M 8/2404; H01M 8/2475; H01M 8/248; H01M 10/052; H01M 10/0525;
(Continued)

(56) References Cited

U.S. PATENT DOCUMENTS

| 6,720,101 B1 | 4/2004 | Dong et al. | |
|---|---|---|---|
| 2004/0112532 A1* | 6/2004 | Yandrasits | H01M 8/0273 |
| | | | 156/308.4 |

(Continued)

FOREIGN PATENT DOCUMENTS

| JP | S63310572 A | 12/1988 |
|---|---|---|
| JP | 2005158615 A | 6/2005 |

(Continued)

OTHER PUBLICATIONS

Abridged translation of JP Office Action dated May 17, 2016, 10 pages.

(Continued)

*Primary Examiner* — Lingwen R Zeng
(74) *Attorney, Agent, or Firm* — Quinn IP Law (57) ABSTRACT

A fuel cell stack and a method of assembling a fuel cell stack includes compressing fuel cells along their stacking axis. A compression retention device made up of an enclosure may be used with one or more optional insertable shims to correct for any stack height variations. Significantly, the enclosure is formed to allow the stack to be loaded in compression by a press such that the cells that make up the stack are placed into and maintained in a substantially compressed state while the compression force is not imparted to the enclosure. By resolving any stack height variances while the cells of the stack are maintained in their substantially compressed state, assembly operations are simplified in that repeated compression and decompression of the stack is avoided while trying to ensure that the stack and enclosure are joined into their final assembly form.

7 Claims, 4 Drawing Sheets

(51) Int. Cl.
*H01M 8/248* (2016.01)
*H01M 8/2404* (2016.01)

(58) Field of Classification Search
CPC ......... H01M 10/0567; H01M 2220/20; H01M 2220/30; H01M 2300/0025; H01M 4/131; H01M 4/362; H01M 4/505; H01M 4/587; H01M 4/625; Y02E 60/50; Y02E 60/122; Y02T 10/7011
See application file for complete search history.

(56) References Cited

U.S. PATENT DOCUMENTS

2012/0021326 A1  1/2012  Morimoto et al.
2014/0147769 A1* 5/2014  Takeyama ............. H01M 8/248
                                                              429/469

FOREIGN PATENT DOCUMENTS

| JP | 2006108058 A | 4/2006 |
| JP | 2008181812 A | 8/2008 |
| JP | 2010212139 A | 9/2010 |
| JP | 2013012325 A | 1/2013 |
| JP | 2013114752 A | 6/2013 |
| JP | 2013152807 A | 8/2013 |

OTHER PUBLICATIONS

Machine translation of JP2013152807 retrieved May 30, 2016, 5 pages.

* cited by examiner

FIG. 6

FUEL CELL STACK AND ASSEMBLY METHOD OF SAME

BACKGROUND

The present disclosure relates generally to a fuel cell stack and assembly method thereof, and more particularly to the fuel cell stack and assembly method thereof by the use of an improved compression retention system during fuel cell stack fabrication.

Fuel cells convert a fuel into usable electricity via chemical reaction. A significant benefit to such an energy-producing means is that it is achieved without reliance upon combustion as an intermediate step. As such, fuel cells have several environmental advantages over internal combustion engines (ICEs) and related power-generating sources. In a typical fuel cell—such as a proton exchange membrane or polymer electrolyte membrane (in either event, PEM) fuel cell—a pair of catalyzed electrodes are separated by an ion-transmissive medium (such as Nafion™). The chemical reaction occurs when a gaseous reducing agent (such as hydrogen, $H_2$) is introduced to and ionized at the anode and then made to pass through the ion-transmissive medium such that it combines with a gaseous oxidizing agent (such as oxygen, $O_2$) that has been introduced through the other electrode (the cathode); this combination of reactants form water as a byproduct. The electrons that were liberated in the ionization of the hydrogen proceed in the form of direct current (DC) to the cathode via external circuit that typically includes a load where useful work may be performed. The power generation produced by this flow of DC electricity can be increased by combining numerous such cells into a larger current-producing assembly. In one such construction, the fuel cells are connected in series along a common stacking dimension—much like a deck of cards—to form a fuel cell stack.

Such stacks are ordinarily assembled under a compressive load in order to seal the fuel cells and to secure and maintain a low interfacial electrical contact resistance between the reactant plates, the gas diffusion media and the catalyst electrodes that make up each cell. In one form, for a notional cell surface area of about 100 in$^2$, a desired compression load on the fuel cell stack typically ranges from about 80 to 160 psi (i.e., about 40 to 80 kN), depending on humidification, and is maintained by a compression retention enclosure that acts as a housing around the fuel cell stack.

To establish the desired compressive force, the fuel cell stack is placed in a press that imparts a load to the stack, after which a compression retention system that includes the aforementioned enclosure is engaged, the press is released, and the stack is held under a pressure retained by the engaged compression retention system. In some cases, the compression retention system may thereafter be placed into a separate enclosure for environmental sealing, while in others, enclosing side panels and end plates may provide any necessary housing and sealing functions. In either case, the enclosed fuel cell stack is then mechanically and electrically secured to the vehicle or related device.

In the aforementioned design where the housing is defined by a series of side panels and end plates, it also typically includes interconnecting tie rods or bracketing elements to bind these discrete components, as well as to maintain a compressive force on the stacked fuel cells. The end plates are then compressed together by the brackets or tie rods that are mounted along the surface of one or more of the side panels. Compressive force is retained by securing the tie rods with bolts or related fasteners that extend normal to the generally planar surface of the side panels such that the bolts are loaded in shear.

Integration of fuel cell stacks into automotive platforms is a demanding challenge to the fuel cell system designer, necessitating precise placement and alignment with balance of plant (BOP) equipment that is situated inside of the vehicle's fuel cell system-receiving compartment. In the present context, BOP refers to components present in the vehicle, including but not limited to blowers, pumps, hoses, compressors or the like that are necessary for fuel cell stack integration, mounting and operability, but which are not part of the fuel cell system itself. Such integration demands tight dimensional tolerances of the assembled fuel cell stack.

Assembled height variance along the stacking direction (which may be thought of as the Z-axis in a conventional Cartesean coordinate system) may be as much as 5 to 10 percent of the overall stack height; the present inventors have noticed variances of up to about ±8 millimeters (or 16 millimeters total) along the stacking direction. Such variances in stack height make it difficult to design a stack possessive of consistent, repeatable dimensions. This in turn hampers subsequent BOP connection and overall system placement within the corresponding vehicle compartment. As such, it would be advantageous to provide a compression retention system which keeps fuel cell stack height variation within tightly-controlled limits. It would also be advantageous to compress a stacked series of fuel cells in such a way that adjustments to the stack height may be made while maintaining the stack in its compressed state in order to substantially achieve the desired height dimension of the assembled stack.

SUMMARY OF THE DISCLOSURE

According to one aspect of the present invention, a method of assembling a fuel cell system capable of accommodating variations in fuel cell stack build height is disclosed. Importantly, the stack compression retention system of the present invention negates effect of stack cell block variation on the external (i.e., outside) stack geometry. In particular, a stack press and related tooling may be used in conjunction with a specially-configured stack-containing enclosure without removing the build press loading. In one form, a press is used to apply a load to a stack or block of individual fuel cells, whereas the stack compression retention system can then be lowered onto and over the stack. The press may be used for both functions, where compressive force may not be needed to move the stack compression retention system, as its weight should be sufficient to ensure proper seating when lowered. By such lowering movement of the stack compression retention system while simultaneously maintaining the compressive on the cell block, any stack height variances that result in the formation of a gap along the stacking axis between the intended mating surfaces of the stack and stack compression retention system could be ascertained such that the selective placement of a shim to fill the gap may be performed.

Regardless of how the press is used, the cooperative placement of the stack compression retention system relative to the cells can be done either before the cells are compressed or after, as in either circumstance, the determination of whether a stack height variance is present that will require the corrective insertion of shims can be made prior to having to secure the two into an entire stack assembly. As such, an important feature of the present invention is that the subsequent attachment of the stack compression retention system to the stack of cells is done only after a suitable determination is made as to whether the gap exists, and if so, how much corrective action will need to be undertaken by shim addition while maintaining the cells in a substantially compressed state. By facilitating the fine-tuning adjustment through optional shim use while keeping the compression retention system in place during the build process, the present invention provides significant improvements in stack fabrication efficiency, as well as reduce the likelihood of cell or retention system damage by avoiding repeated compressive loading and unloading of the stack. Additional benefits accrue through simplified environmental sealing, where not only may seal part count be reduced and simplified as the interfacial contact is preferably between planar surfaces with simple geometric shapes. Yet another benefit is that bolts or related fasteners that are used to secure the stack and enclosure together into the assembly are loaded in tension, thereby avoiding the less structurally-desirable shearing action imparted to the bolts that are secured orthogonally to the direction of the compressive force. Yet another benefit is that the stack assembly and compression of the present invention permits full access to the edges of the individual cells within the block throughout the entire stack build process as well as to any gaps that may exist between the enclosure and the stacked cells; this helps with diagnostic and related assembly operations (such as the selective insertion of shims as discussed in more detail below).

According to another aspect of the present invention, a method of assembling a fuel cell stack is provided such that stack height variations are avoided. The method also includes compressing the stack (which is made up of numerous cells disposed between a pair of end plates) in the press, and selectively inserting one or more shims (i.e., on an as-needed basis) in a gap that may form in the region between one of the end plates and a complementary adjacent surface of the rigid environmental enclosure while maintaining the stack in the substantially compressed state. It will be understood by those skilled in the art that such selective shim insertion is tantamount to placing as many shims as necessary in order to fill the gap produce by the stack height variation, and that in a degenerate sense this may include zero as a lower bound in those situations where there is substantially no stack height variance and no resulting gap. The method also includes providing the rigid environmental enclosure (where such rigidity may stem from the unitary nature of its structure) to help keep the height dimension invariant. In one form, the top of the enclosure has an aperture formed in it to facilitate the relatively unencumbered passage of the press tooling through the enclosure during the time where the compression of the stack is being applied and maintained. Thus, the travel direction of the press tooling is substantially collinear with the stacking axis of the individual cells. The structure of the enclosure (including its aperture) is such that when placed in cooperation with the press, a tool that forms at least a portion of the press passes through the enclosure's aperture to substantially avoid imparting a compressive force to the enclosure or the one or more shims. The optional shims are configured such that during the compressing, contact defined between the press and the respective end plates of the stack does not impart a compressive force on the shim, thereby avoiding having to adjust the press and accompanying tooling to decompress (and subsequently re-compress) the stack in order to add, remove or replace shims as a way to adjust the stack height as a way to package it within the enclosure. Upon confirmation that the desired stack height (either with or without shims) is within a predetermined tolerance, the environmental enclosure is placed on the stack. From this, the stack and optional shims are encased within the environmental enclosure while the stack is in its substantially compressed state, after which the environmental enclosure is attached to the stack such that a height of the assembly defined by the stack does not vary over that of the initial dimension of the environmental enclosure.

According to yet another aspect of the present invention, a method of assembling a fuel cell stack includes arranging a plurality of individual fuel cells along a stacking axis, placing a pair of end plates on substantially opposing ends of the cells to define a stack, using a press to place the stack into a substantially compressed state, providing an environmental enclosure that comprises a rigid structure that defines at least one aperture normal to the stacking axis, determining if a heightwise gap exists along the stacking axis between the top of the compressed stack and an adjacently cooperative part of the enclosure such that if such a gap is present, inserting at least one shim to close the gap while maintaining the stack in its substantially compressed state. In this way, the press and the aperture cooperative such that a compressive force from the press is not imparted onto either the shims (whose placement is such that they substantially mimic the aperture of the enclosure) or the enclosure. After any gaps that may have been present as a result of variation of the stack height are filled in, the enclosure and stack are secured to one another to define an assembled stack. As with the previous embodiments, fasteners or related devices used to secure the enclosure to the compressed stack are aligned along the stacking axis to ensure that they are loaded at least primarily in tension.

According to yet another aspect of the present invention, a fuel cell stack includes a numerous fuel cells arranged along a stacking direction, along with end plates configured to hold the stacked fuel cells and an environmental enclosure provided around the stacked fuel cells and end plates. The enclosure has an aperture along the stacking direction to permit a press to pass through the aperture and make compressive contact with the stack, end plates or both. One or more shims may be placed between the enclosure and the stack to maintain a predetermined stack height along the stacking direction such that upon compressive engagement between the press and the stacked fuel cells, the surface of the stack defined by the predetermined height cooperates with the complementary surface of the enclosure to define a secure (and substantially gap-free) fit between them. In one particular form, the shim (or shims) may be placed along a shape defined by the aperture, while in another the shim or shims may define non-rectangular shapes. In one preferred form, the connection between the end plates and the enclosure makes up a box-like structure where these parts are secured to one another via one or more bolts or fasteners. In a more preferred form, these fasteners are loaded in tension upon establishment of the connection, the tension arising out of the compressive contact between the enclosure and the end plates along the stacking direction. To keep the enclosure lightweight, its sidewalls may define a thin-walled structure with periodically-spaced reinforcing ribs or related selective rigidity-enhancing components.

BRIEF DESCRIPTION OF THE FIGURES

The following detailed description of the preferred embodiments of the present invention can be best understood when read in conjunction with the following drawings, where like structure is indicated with like reference numerals and in which the various components of the drawings are not necessarily illustrated to scale.

DETAILED DESCRIPTION OF THE PREFERRED EMBODIMENTS

Figure 1:
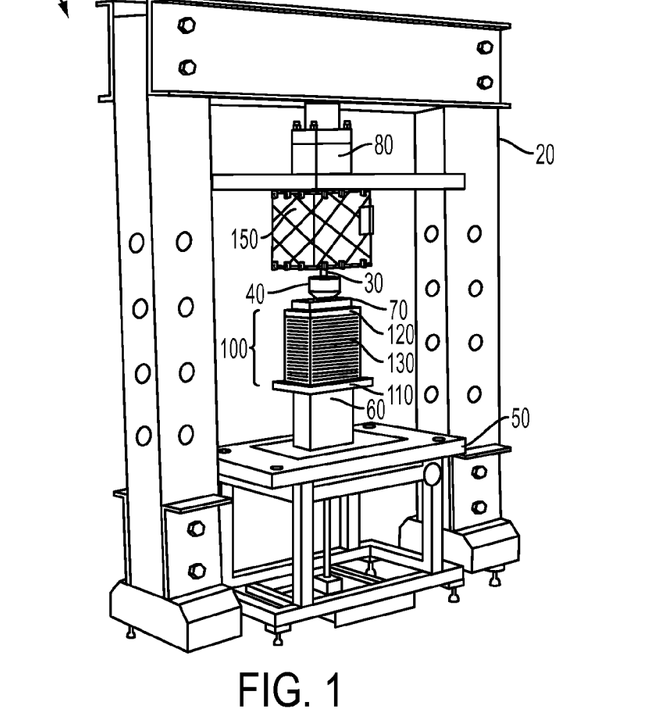
FIG. 1 depicts a press used to assemble a fuel cell system according to an aspect of the present invention.
Figure 2:
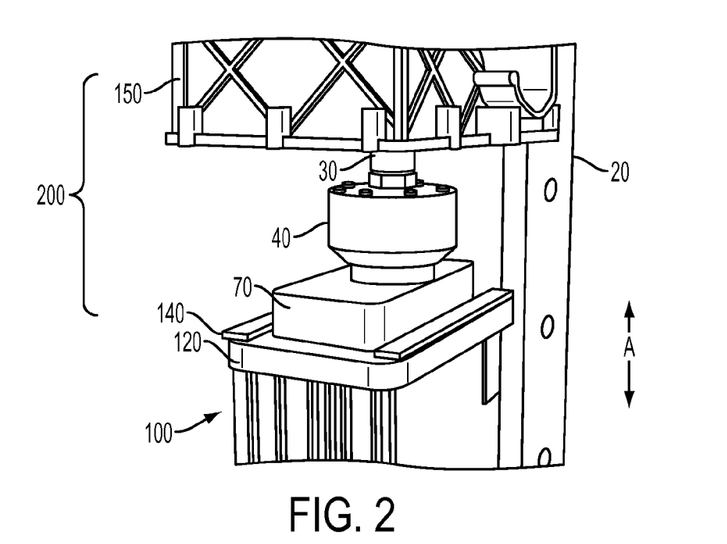
FIG. 2 depicts details of a portion of the press of FIG. 1.

Referring first to FIGS. 1 and 2, the use of a press 10 to achieve compression of a fuel cell stack 100 is shown. Press 10 includes numerous frame-like members 20, rod 30, load cell 40, assembly platform 50, lower tool 60, upper tool 70 and one or more actuators 80. In the present context, one or more of these press components or portions can be thought of as a pressing agent; the precise nature of such pressing (for example, direct physical contact, response to a larger pressing motion or the like) will be contextually apparent. For example, upper tool 70 may—in conjunction with one form of actuator 80—be made to perform a loading or compressing function that is at least partially independent of a loading or compressing function performed by other moveable press components. By way of example, the movement of tool 70 (as well as the consequent load imparted to stack 100) may be done independently of the press 10 that is responsible for placement and subsequent secured attachment of an environmental enclosure 150 (discussed in more detail below) to stack 100. In another form, movement of the portion of press 10 that is responsible for lowering the enclosure onto the stack 100 may not require any significant compressing capability, as the weight of the enclosure 150 may be sufficient to allow gravity to establish the necessary contact between the two. In such a configuration, another form of actuator 80 may be cooperative with enclosure 150 to control its vertical movement during secure placement between it and the fuel cell stack 100. Furthermore, it will be appreciated by those skilled in the art that other components, such as a programmable controller and ancillary equipment (none of which are shown) may also be included to facilitate the desired compression and assembly functions of press 10. Likewise, a linear variable display set (also referred to as a linear variable differential transformer, not shown) for reading, ascertaining or otherwise determining the height of a compressed stack of fuel cells may be used in conjunction with load cell 40 and other components in order to provide information of how much shim (also referred to as shim stock) thickness (if any) is needed to make up for negative deviations from an ideal or target compressed stack height.

Although not shown in detail, the stack 100 is made from numerous individual (and generally planar, rectangular pouch-like) fuel cells 130 that are arranged in a facingly-adjacent relationship similar to a deck of cards, where each cell 130 may include a substantially planar PEM, anode catalyst layer in facing contact with one face of the PEM, and cathode catalyst layer in contact with the opposing PEM face. Collectively, the PEM and catalyst layers are referred to as the membrane electrode assembly (MEA). An anode diffusion layer is arranged in facing contact with the anode catalyst layer, while a cathode diffusion layer is arranged in facing contact with the cathode catalyst layer. Each of diffusion layers are made with a generally porous construction to facilitate the passage of gaseous reactants to the catalyst layers. As will be understood by those skilled in the art, anode catalyst layer and cathode catalyst layer are referred to as electrodes, and can be formed as separate distinct layers as shown, or in the alternate, as embedded at least partially in the respective diffusion layers, as well as embedded partially in opposite faces of the PEM. It will also be appreciated by those skilled in the art that variations on these and other constructions of each fuel cell 130 and accompanying hardware (such as gaskets, frames or the like) are to be compatible with stack 100. In one form, stack 100 has the aforementioned opposing end plates 110 and 120 (which are often associated with a wet end and dry end, depending on the stacking orientation of stack 100) that are used to generally define the stack 100 upper and lower bounds. Once the individual cells 130 that make up stack 100 are placed and aligned, press 10 can be used in conjunction with the environmental enclosure 150 to form a substantially complete stack assembly.

Significantly, enclosure 150 acts—in conjunction with the optionally-placed shims 140 that are discussed in more detail below—to make up the compression retention system (also referred to herein as stack compression system, compression retention device or the like) 200 of the present invention. Rather than rely upon numerous discrete side panels to define a generally rectangular box, the environmental enclosure 150 is preferably formed from a unitary structure to avoid the vagaries of an assembled enclosure made from discrete, connectable components. In this way, the internal dimensions of the enclosure 150 are known, and it is to these internal dimensions (in particular, the height dimension of the flanges, shoulders or other related structure to which the adjacent portions of the top of the compressed stack 100 will engage) that the target height (also referred to herein as predetermined height) of stack 100 is designed to fit. Likewise, the rigid end plates 110, 120 of stack 100 are fixedly secured to the respective invariant dimensions of the environmental enclosure 150 as a way to help ensure consistent, repeatable dimensions of the finished stack assembly. In this context, the end plates 110 and 120 may be thought of as being the interface between the stack 100 and the compression retention system 200 as a way to receive the compression force. Significantly, the shims 140 help to bridge any gaps between the uppermost surface of the stack 100 and the invariant dimensions of the corresponding inner surfaces of the environmental enclosure 150; in this way, a secure fit is formed between the stack 100, end plates 110, 120 and environmental enclosure 150. In the present context, a secure fit is one where gaps or related manufacturing tolerances (as well as attendant assembled height variance along the stacking direction) that would otherwise exist between the stack 100 and the mating surfaces of the enclosure 150 are substantially reduced or eliminated to ensure predictable, repeatable placement of the stack assembly into the vehicle BOP. In accordance with further embodiments of the invention, at least one of the end plates (for example, end plate 110) is configured to provide integration with BOP and vehicle mounting structures. Moreover, the end plates 110 and 120 may be fabricated by any known means, including stamping, molding, extruding or the like, and may be made from a structurally suitable material such as aluminum or its alloys. End plates (also referred to as end caps) 110 and 120 act as structural members capable of receiving the compressive force press 10 without deforming. Likewise, the environmental enclosure 150 is preferably made from a comparably suitable material such as the aforementioned aluminum or its alloys, and can be made thin-walled with selective rigidity or stiffness enhancements, such as the diamond-shaped ribbing pattern depicted in the figures.

Importantly (as will be discussed below) environmental enclosure 150 has a generally rectangular-shaped aperture 150A formed in its upper planar surface. An area of the aperture 150A is smaller than an area of the end plate 120 disposed at an end of the fuel cell stack 100. The large size of the footprint defined by aperture 150A relative to the rod 30 and load cell 40 of press 10 makes it easy to move the environmental enclosure 150 up and down the stacking axis without contacting or otherwise interfering with stack 100, rod 30 and load cell 40.

Referring with particularity to FIG. 2, the structurally rigid attributes of the end plate 110 (not presently shown) and end plate 120 facilitate relatively even distribution of the compressive force over the surface of the stack 100. In operation, the rod 30 (upon an imposed force from one or more frame-like members 20) imparts a compressive load of between about 40 kN and 80 kN, depending (as mentioned above) on the level on humidification (and consequent cell swelling) to the top end plate 120 of stack 100 along the stack 100 axial (i.e., stacking) dimension A. Load cell 40 may be used to ensure that the proper amount of force is being applied through the rod 30 to the end plate 120; in one form, load cell 40 includes feedback attributes to the controller (not shown) to ensure attainment of a suitable load, displacement or related parameter. As mentioned above, a variable linear display set or related device may be used to determine how closely a particular compressed stack adheres to dimensional (in particular, stack height) design goals. The load cell 40 and rod 30 are coupled to the generally rectangular upper tool 70 to transmit the compressive load to the stack of cells 130 through end plate 120. Upper tool 70 defines an external perimeter dimension that makes up a compression footprint that engages the top of the stack 100 (such as upper end plate 120) to provide the necessary compressive force while simultaneously avoiding compressive load transfer to shims 140; such avoidance is due to the larger footprint formed by the aforementioned aperture 150A of the environmental enclosure 150 and the aperture 140A (shown and discussed in conjunction with FIG. 4 below) that is defined upon perimeter placement of the shims 140.

Figure 3:
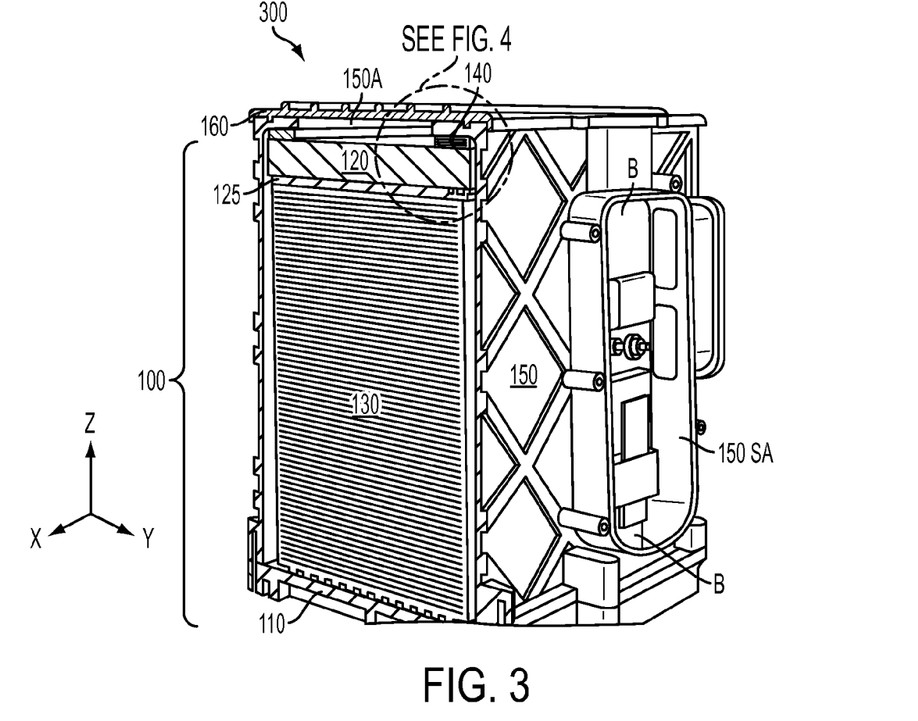
FIG. 3 shows a partial cutaway of an assembled stack and compression retention enclosure.
Figure 4:
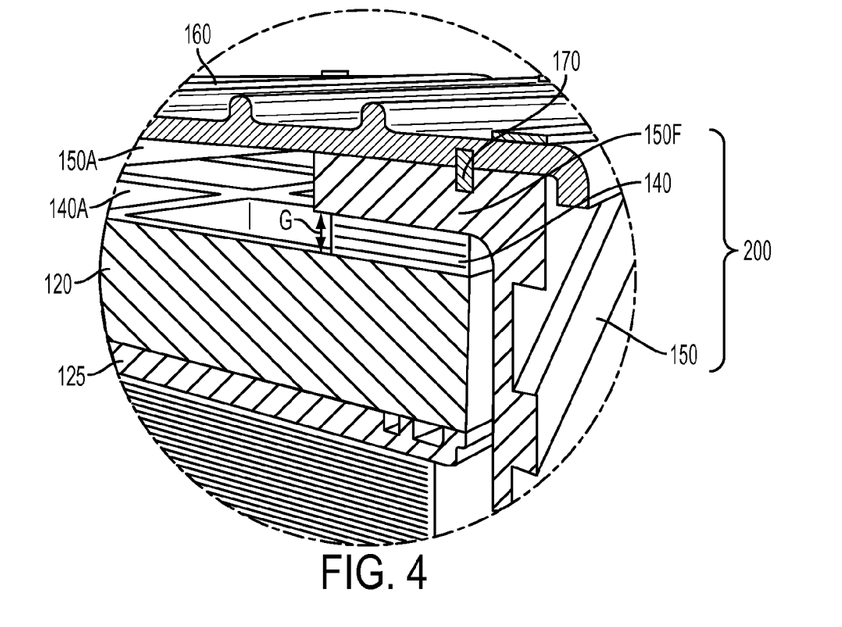
FIG. 4 shows a detail view of a corner of the assembled stack and compression retention enclosure of FIG. 3, highlighting the insertion of shim stock.

Referring next to FIGS. 3 and 4, a substantially complete stack assembly 300 includes the stack 100 enclosed by the compression retention system 200. The assembly 300 is shown in a partial cutaway from to emphasize the interaction of the fuel cells 130 and end plates 110, 120 with shims 140 and flange 150F of the environmental enclosure 150. This helps to ensure that—after assembly of the fuel cell stack 100 but prior to its insertion into the corresponding vehicular compartment—the outer dimension of the stack assembly 300 is consistent and repeatable to promote the desired reduction or substantial elimination of the stack height variation mentioned above. Humidity, temperature and other environmental parameters can be factors in the amount of cell membrane swelling. This, coupled with the large number (in some cases, upwards of three hundred or more) of individual cells 130 per stack 100, means that the cumulative effect of even very small thickness variances in those components can amount to between a 5 and 10 percent variance (which may correspond to the up to 16 millimeters in height variance mentioned above) of the entire stack 100. Because these significant variations have a deleterious impact on subsequent BOP-related assembly operations, the need for understanding and compensating for such variations along the stacking axis A to ensure proper final stacked dimension is paramount. More particularly, in situations where the height of the compressed stack 100 is at (or slightly above) its target height, no gap between the top of stack 100 and the mating surface of the enclosure 150 will be present, meaning that (and assuming that the pressures on each of the cells 130 is not excessive) the completed final assembly that includes the stack 100 and enclosure 150 will both have the desired outer dimensions—and thereby ensuring ease of integration with BOP equipment—and suitable level of secure internal fit, even absent the presence of additional shims. On the other hand, if the assembled and compressed height of stack 100 is less than the nominal target, a gap G between the lower surface of the enclosure (manifested presently in FIG. 4 by the lower surface of flange 150F) and the stack 100 (for example, the upper surface of the upper end plate 120) may be present. In this event, the invention permits insertion of one or more shims 140 without having to unload the compressive forces from the stack 100 or otherwise reverse any of the assembly steps that have been undertaken hitherto the determination of the presence of gap G. In one form, the determination of whether such a gap G is present can be made with the assistance of automated means, such as the aforementioned linear variable display set and load cell 40.

Compared to known compression retention systems that employ tie rods, side plates, metal banding or the like, the present invention provides for the placement of the compressed stack 100 into a rigid structural enclosure 150 with an outer dimension that is invariant to help promote ease of vehicle BOP mounting and integration. As such, the approach of the present disclosure allows the connection between the environmental enclosure 150 and the bottom end plate 110 to be secured via bolts or related fasteners 155 that are loaded in the more desirable tension direction (i.e., along the stacking axis) than in a sliding/shear direction. This substantially eliminates the problems associated with floating end plates (especially at the so-called lower or wet end where integration with vehicle BOP often dictates system complexity), while avoiding undesirable shear-based securing mechanisms and related structural support that arise out of the use of slidably-adjustable reinforcement along the sides of the discrete components that make up a conventional box-like enclosure. As such, the fasteners 155 and the bottom end plate 110 may be thought of as either a part of the compression retention system 200 or cooperative with it; either variant is deemed to be within the scope of the present invention.

Furthermore, as discussed in more detail below, the completed stack assembly (including the environmental enclosure 150) may include simplified sealing functions that not only involve a part count reduction, but are also capable of withstanding larger sealing pressure differentials. As shown with particularity in FIG. 3, numerous inlets, outlets and manifolds may be formed in the environmental enclosure 150 to provide additional structural features to facilitate reactant and coolant conveyance, electrical current flow from busbars B, as well as diagnostic and maintenance access, among others. In one form, these access points may be in the form of apertures 150SA that are formed into one or more of the enclosure 150 sidewalls 150S. As is discussed elsewhere herein, the myriad apertures can benefit from a structurally-enhanced sealing configuration.

More significantly, as shown in the upper right corner of the enclosed stack of FIG. 3, a particular structural configuration of the environmental enclosure 150 and upper end plate 120 of the compression retention system 200 permits the aforementioned symbiotic orderly compressive assembly of the various cells 130 of the fuel cell stack 100. Referring with particularity to FIG. 4, at least the upper end plate 120 may—upon removal of cover 160 that is normally added only once stack 100 and enclosure 150 are secured to one another—be exposed to the adjacent lower surface of upper tool 70 of FIGS. 1 and 2 through a substantially rectangular-shaped aperture 140A that is formed by the placement of the shims 140 about the perimeter of the upper surface of the upper plate 120. In one form, the apertures 140A formed by the placement of shims 140 define about the same sized footprint as the generally collinear and adjacently-placed aperture 150A of the environmental enclosure 150, and while the precise size of one relative to the other isn't critical (so long as the desirable compressive contact between them is maintained in order to allow compressive loads being transmitted through them to the top of upper end plate 120), the footprint they define must be large enough to allow the unimpeded passage of the upper tool 70 along the stacking axis. In this way, the compressive load delivered from the rod 30, load cell 40 and upper tool 70 can be transmitted evenly across the face of the stack 100 that is defined by a surface within the X-Y plane shown in FIG. 3, while simultaneously permitting (if needed) the introduction or removal of one or more of shims 140 as a way to establish a predetermined height of the compressed stack 100 even while the compressive load from press 10 continues to be applied. Within the present context, a surface area of the stack 100 is defined to generally coincide with the largest planar dimension of the cells 130. More importantly, by imparting the compressive load to the upper plate 120 and underlying stack 100 while simultaneously avoiding compressively loading the optional shims 140, the stack 100 may be maintained in a substantially compressed state while shim 140 addition or removal can be undertaken, thereby significantly simplifying the overall process of forming the complete stack assembly 300.

Also significant is that because the environmental enclosure 150 is made from a rigid, unitary structure with a top aperture 150A aligned with the upper tool 70, aperture 140A defined by shims 140 and the top of stack 100, the subsequent placement of the environmental enclosure 150 onto the compressed stack 100 takes place with the assurance that the finished assembly adheres to the precise outer dimensions (including the critical height dimension) established by the rigid nature of the environmental enclosure 150. As such, the generally rectangular aperture 150A operates in a manner similar to aperture 140A in that when both are substantially aligned such that the stacking axis projects normally though them, they permit the compressive load to the stack 100 while simultaneously leaving the peripheral region defined by the shims 140 to stay in an uncompressed state, thereby facilitating ease of shim 140 insertion, removal, placement or other related operations needed to ensure that the final height of stack 100 both stays within design tolerances and is capable of fitting within the volume defined by the environmental enclosure 150.

In the present context, the term "aperture" is meant to include not just those passages defined by a substantially continuous picture frame-like surrounding structure in the shims 140 or environmental enclosure 150, but also those where there may be lateral breaks in such structure (such as those to permit access through the side of the respective shims or enclosure); all variants that still preserve both the structure of the respective component and the unobstructed compressive cooperation between the tool 70 and upper end plate 120 of stack 100 are deemed to be within the scope of the present invention. Likewise in the present context, terms that denote contact, cooperation or related interaction between the stack 100 and the compression retention device 200 will be understood to include all respective components regardless of whether direct facing contact is included. As such, cooperation between the press 10 and the stack 100 may be effected by direct contact between the lower surface of the upper tool 70 and the upper surface of the upper end plate 120, where an insulator plate 125 may be placed between the lower surface of the upper end plate 120 and a facingly-adjacent upper surface of stack 100 to promote electrical and thermal insulation between them.

Figure 5:
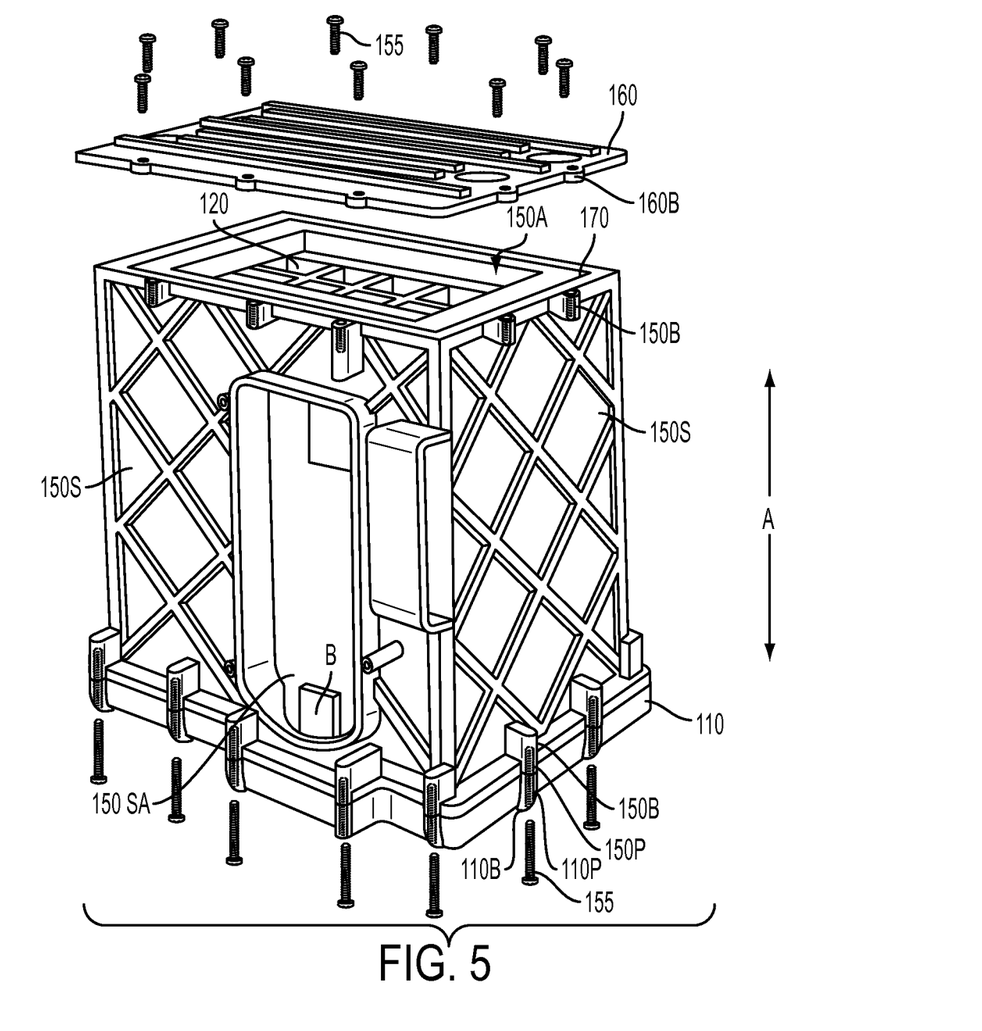
FIG. 5 shows a substantially complete stack and compression retention system assembly, as well as one possible sealing configuration in the form of a perimeter seal.

Referring next to FIG. 5 in conjunction with FIG. 4, a fuel cell system made in conjunction with the present invention may provide environmental sealing in a variety of ways, including the use of significantly simple, continuous press-in-place "picture-frame" style face seals 170 from the planar interaction between an upper surface in the upper end plate 120 and a lower surface of a cover 160 that forms an aperture in the environmental enclosure 150. A side aperture 150SA is formed in one or more of the sidewalls 150S of the environmental enclosure 150. Aperture 150SA facilitates ease of user access to allow diagnostic testing and related functions. As with other apertures formed in environmental enclosure 150, seals (such as seal 170 of FIG. 4) may be included around the aperture periphery. Significantly, the attachment between the enclosure 150 and the lower end plate 110 includes the formation of a threaded attachment between the two using bolts 155. More particularly, lower end plate 110 defines a plurality of circumferentially-spaced bosses 110B that define a vertically-oriented threaded path 110P therein that extends through the thickness defined by bosses 110B and is sized to accept bolts 155. Complementary-spaced and sized vertically-oriented threaded paths 150P formed in bosses 150B of the enclosure are used in conjunction with the bolts 155 to promote fastened connection between the enclosure 150 and the lower end plate 110. During assembly, the enclosure 150 is pulled or stretched toward the lower end plate 110 by the screwing action of the bolts 155 into the vertically-oriented threaded paths 110P and 150P in response to the flange 150F of the enclosure 150 pushing the shims 140 and the fuel cells 130 downward. In a like manner, this loading in tension between the enclosure 150 and the lower end plate 110 through the bolts 155 can be achieved when the fuel cell stack 100 is loaded by being pulled downward. A similar threaded arrangement is employed between bosses 160B that are formed in the cover 160 and bosses 150B spaced about the top of enclosure 150. Thus, when the stack 100 is loaded compressively (first by press 10 and subsequently by the compression retention device 200 made up of enclosure 150 and shims 140 cooperative with lower end plate 110), it is the threaded bolts 155 that are loaded in tension to oppose this force that provide improved structural capacity relative to configurations where such fastening may take place through the thickness of one or more side panels and result in a less-desirable shear loading.

Figure 6:
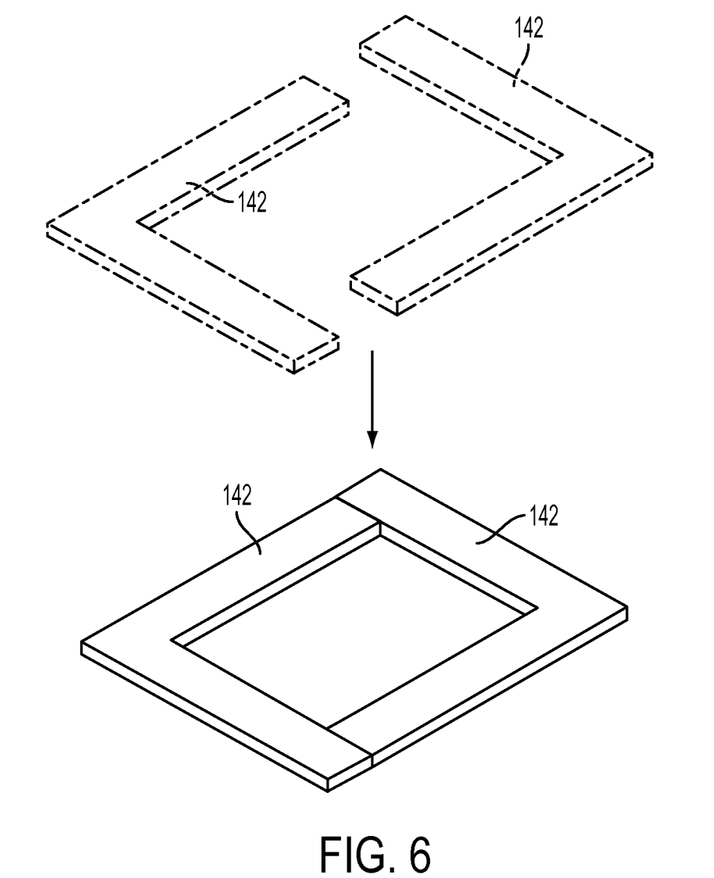
FIG. 6 shows an alternate embodiment for the shim stock used in FIGS. 2 and 4.

Referring next to FIG. 6 in conjunction with FIGS. 2 and 4, the shims 140 need not be of the rectangular shape depicted in FIG. 2; in the alternate configuration shown with particularity in FIG. 6, the gap-filling may be achieved by the placement of two L-shaped shims 142 that are placed about the periphery of the quadrangular aperture 150A that is formed in the upper part of the enclosure 150. Furthermore, although the shims 142 (as well as shims 140 depicted in FIG. and 4) are presently shown as having substantially common thicknesses, there is nothing that would prohibit the use of a combination of relatively thick shims and relatively thin shims to achieve the desired degree of gap G closure; either variant is deemed to be within the scope of the present invention. With the L-shaped variants in particular, it is easy to form a continuous contact surface about a substantial periphery of the aperture 150A.

It is noted that terms like "preferably", "generally" and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention, it is noted that the terms "substantially" and "approximately" and their variants are utilized herein to represent the inherent degree of uncertainty that may be attributed to any quantitative comparison, value, measurement or other representation. The term "substantially" is also utilized herein to represent the degree by which a quantitative representation may vary from a stated reference without resulting in a change in the basic function of the subject matter at issue.

Having described the invention in detail and by reference to specific embodiments, it will nonetheless be apparent that modifications and variations are possible without departing from the scope of the invention defined in the appended claims. In particular it is contemplated that the scope of the present invention is not necessarily limited to stated preferred aspects and exemplified embodiments, but should be governed by the appended claims.

We claim:

1. A fuel cell stack comprising:
   a plurality of fuel cells which are stacked in a stacking direction;
   a plurality of end plates configured to hold the stacked fuel cells in the stacking direction;
   an environmental enclosure provided around the stacked fuel cells, the environmental enclosure defining an aperture along the stacking direction to permit a press to enter therethrough; and
   at least one shim placed between the environmental enclosure and the stacked fuel cells, the at least one shim being configured to maintain a predetermined height of the stacked fuel cells in the stacking direction such that upon compressive engagement between the press and the stacked fuel cells, the stacked fuel cells with the predetermined height cooperate with the environmental enclosure to define a secure fit therebetween.

2. The fuel cell stack according to claim 1, wherein the at least one shim is placed along a shape defined by the aperture.

3. The fuel cell stack according to claim 2, wherein the at least one shim placed along the shape comprises a plurality of L-shaped shims placed about a substantial periphery of the aperture.

4. The fuel cell stack according to claim 1, wherein one of the plurality of end plates and the environmental enclosure are attached with at least one fastener.

5. The fuel cell stack according to claim 1, further comprising a stack manifold disposed within the environmental enclosure.

6. The fuel cell stack according to claim 1, wherein the aperture is defined on a portion of the environmental enclosure proximate a first of the plurality of end plates, the first of the plurality of end plates disposed within the environmental enclosure, and wherein the first of the plurality of end plates is engaged with the press when the at least one shim is placed between the environmental enclosure and the stacked fuel cells.

7. The fuel cell stack according to claim 1, wherein an area of the aperture is smaller than an area of one of the plurality of fuel cells.

* * * * *

UNITED STATES PATENT AND TRADEMARK OFFICE
CERTIFICATE OF CORRECTION

PATENT NO. : 9,997,800 B2  
APPLICATION NO. : 14/326813  
DATED : June 12, 2018  
INVENTOR(S) : David A. Martinchek et al.

Page 1 of 1

It is certified that error appears in the above-identified patent and that said Letters Patent is hereby corrected as shown below:

On the Title Page

Item (73), The Assignees should read:  
GM Global Technology Operations LLC Detroit, MI  
Honda Motor Co., Ltd. Tokyo, JP Signed and Sealed this  
Sixteenth Day of April, 2019

Andrei Iancu  
*Director of the United States Patent and Trademark Office*